Dec. 25, 1956 C. L. SHADBOLT 2,775,695

VARIABLE FREQUENCY PULSE GENERATOR

Filed Sept. 30, 1953

INVENTOR.
CHARLES L. SHADBOLT,
BY
Nicholas T Volk
HIS ATTORNEY.

2,775,695

VARIABLE FREQUENCY PULSE GENERATOR

Charles L. Shadbolt, Santa Monica, Calif., assignor, by mesne assignments, to Hughes Aircraft Company, a corporation of Delaware Application September 30, 1953, Serial No. 383,187

6 Claims. (Cl. 250—27)

This invention relates to trigger or pulse generators and more particularly to a pulse generator capable of producing pulses at an exact point on the cycle of a variable frequency synchronizing voltage.

Variable frequency pulse generators have long been known in the prior art but have disadvantages in that either a large number of tubes are required to produce accurately timed pulses or, in the case where a sine wave is used to trigger a pulse generator, the tube that is triggered would "fire" at different parts of the sine wave cycle dependent on numerous factors such as, for example, temperature variations and varying degrees of ionization within the tube. The firing of the tube at different parts of the sine wave cycle results in what may be called "flutter," that is, a variation in the time interval between pulses.

It is therefore an object of the present invention to provide an improved apparatus for generating accurately timed pulses.

Another object of the present invention is to provide a variable frequency pulse or trigger generator employing only a few tubes, and which produces output pulses at corresponding points of each cycle of a sine wave synchronizing voltage.

Another object of the invention is to provide a variable frequency pulse generator that may be accurately synchronized with a very wide range of audio frequencies.

In carrying out the foregoing objects, I apply the sine wave synchronizing voltage to a stage of class C amplification to amplify only a narrow symmetrical more positive portion of each cycle to produce a series of sine wave pulses. These pulses are impressed on a unidirectional conducting device through a capacitor for shorting or grounding the leading edge of each pulse, resulting in the voltage across the unidirectional conducting device going sharply positive commencing with the inversion point of the pulse. This voltage is impressed together with a direct-current reference potential on a coincidence circuit to produce a potential for triggering a blocking oscillator. In this manner, corresponding points of each cycle are chosen to trigger a blocking oscillator which produces the desired output pulses.

Particular advantages of the variable frequency pulse generator of the present invention are that it may be synchronized to a wide range of input frequencies with no change in circuit parameters and, in addition, generates pulses without flutter.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
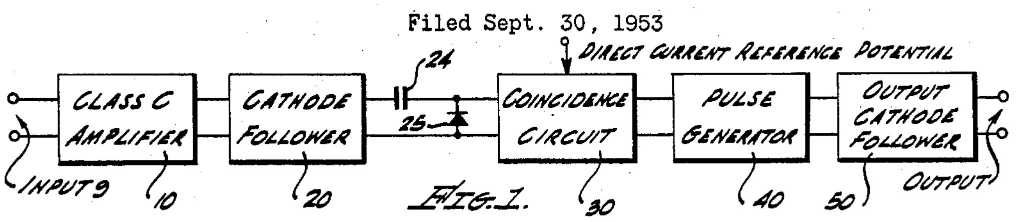
Figure 1 is a block diagram of my invention.

Referring now to the drawings, Fig. 1 illustrates a schematic block diagram of the variable frequency pulse generator of the present invention. The basic elements of the variable frequency pulse generator comprise a class C amplifier 10, a cathode follower 20, a series capacitor 24, a shunt crystal diode 25, a coincidence circuit 30, a pulse generator 40, and an output cathode follower 50. The output of class C amplifier 10, which is responsive to a sine wave synchronizing voltage to be applied at input terminals 9, is applied through cathode follower 20 and series capacitor 24 across crystal diode 25. The voltage developed across crystal diode 25 is impressed, together with a direct-current reference potential, on coincidence circuit 30, the output of which is used to trigger pulse generator 40. The output cathode follower 50 provides a low impedance output from pulse generator 40.

Figure 2:
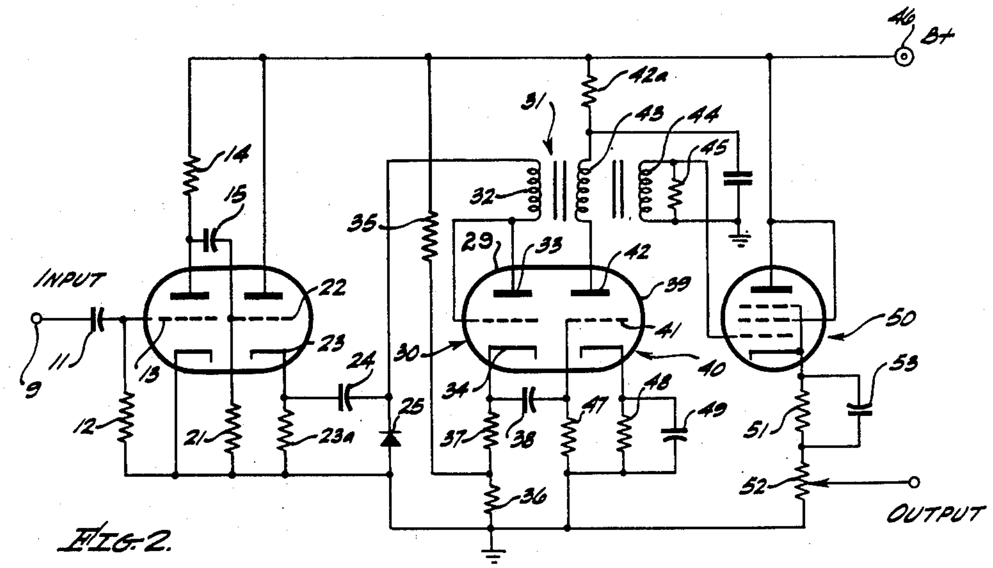
Figure 2 is a schematic diagram of a circuit embodying my invention.
Figures 3, 4:
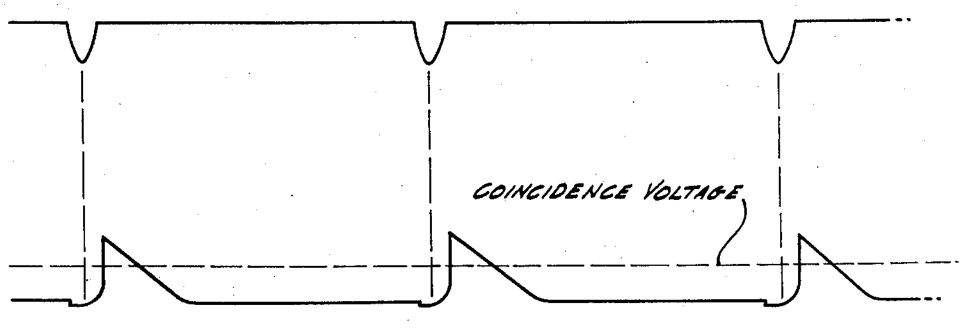
Figure 3 is the waveshape at the output of the class C amplifier stage of the circuit of Figure 2.
Figure 4 is the waveshape at the output of capacitor 24 of the same circuit.

A preferred circuit of this block diagram for practicing the present invention is shown in Figure 2. In this circuit, a suitable sine wave alternating-current time wave, the frequency of which may be widely varied, for example, from 200 to 1600 cycles per second, is fed to input terminal 9 through a capacitor 11 to a grid 13 of class C amplifier 10. The time constant of capacitor 11 and a resistor 12, connected from grid 13 to ground, is substantially longer than a period of the applied signal so that grid 13 is self-biased beyond cutoff for all but the most positive portion of each cycle of the input signal. The output of amplifier 10 develops a potential across a load resistor 14 which is applied through a capacitor 15 across a grid resistor 21 to a grid 22 of cathode follower stage 20. The output of amplifier 10, which is impressed on cathode follower stage 20, constitutes a series of negative sine wave pulses having a repetition rate equal to the frequency of the input signal. The waveshape of these negative pulses from class C amplifier stage 10 is shown in Figure 3.

As grid 22 of cathode follower 20 is pulled negative by the leading edge of a negative pulse, cathode 23 will follow. A capacitor 24, coupled to cathode 23, has its output connected through crystal rectifier 25 (which may be commercial type IN34) to ground. Crystal rectifier 25 is poled so that current will flow only when the output of capacitor 24 is negative with respect to ground. Hence, negative excursions of the potential on the cathode 23 are grounded and removed from the wave fed through a winding 32 of a pulse transformer 31 to a plate 33 of a diode 29 of coincidence circuit 30. Therefore, as the input of condenser 24 is pulled negative by the signal appearing on cathode 23, the output of condenser 24 is held at approximately ground potential by the low impedance path through the crystal diode 25. As this signal swings up in the positive direction, however, an output voltage having a very sharp wave front at the trailing edges of the sine wave pulses is generated across diode 25 on the output side of capacitor 24. The wave shape appearing at the output of capacitor 24 is illustrated in Figure 4. The time constant of capacitor 24 together with the back resistance of the crystal 25, along with the effect caused by the pulse generator stage 40, determines the discharge characteristic (downward slant of the curve) illustrated.

As mentioned, the output from capacitor 24 is applied through winding 32 of pulse transformer 31 to plate 33 of diode 29. A direct-current reference potential, determined by a dividing network comprising resistors 35 and 36, is applied through a resistor 37 to a cathode 34 of diode 29. This positive potential may be of the order of twelve volts positive with respect to ground so that coincidence is obtained and a trigger signal produced at the steep part of the wave front of the output voltage developed across crystal diode 25. When the potential on anode 33 exceeds that on cathode 34 of diode 29 in coincidence circuit 30, a current flows which causes the potential on cathode 34 to rise, this rise in potential being reflected through a capacitor 38 to a grid 41 of triode 39 of pulse generator stage 40. This causes the triode 39 of this stage to conduct, and current commences to flow through a winding 43 of pulse transformer 31. This current in winding 43 induces a potential across winding 32, rendering the plate 33 of coincidence diode 29 more positive. This more positive potential increases the current flow in coincidence circuit 30, thereby raising the positive potential on the input side of capacitor 38 which, in turn, increases the potential on grid 41 to increase the current in winding 43. The feedback from the anode 42 of the pulse generator triode 39 to its grid 41 through windings 43 and 31, diode 29 and capacitor 38 continues until the grid 41 becomes sufficiently positive with respect to its associated cathode as to attract electrons therefrom in numbers sufficient to bias the triode 39 to cutoff.

During the interval prior to the next pulse, capacitor 38 acquires a positive charge on that side of it connected to resistor 37 as determined by the voltage divider 35—36, and discharges to ground potential on the side connected to grid 41 through a resistor 47. Consequently, the triode 39 will be nonconducting in the interval between cycles, and will repeat the foregoing cycle of operation in response to each surge of the potential shown in Figure 4.

The output winding 44 of transformer 31 may feed a cathode follower 50 which may be designed to improve the shape of the output pulses and to provide a low impedance output. Since output stage 50 is well known in systems of this type, and further since it may be omitted entirely or replaced with any other conventional amplifier, its details need not be described.

While the values of the several resistors and capacitors are not critical, I am setting forth typical values in order to aid those desiring to practice my invention.

| | |
|---|---|
| Capacitors **11**, **15**, and **53** | 0.01 μf. |
| Capacitor **24** | 0.005 μf. |
| Capacitor **38** | 270 μμf. |
| Capacitor **49** | 0.1 μf. |
| Resistor **12** | 1.1 meg. |
| Resistor **14** | 47K. |
| Resistor **21** | 11K. |
| Resistors **23***a*, **36** and **37** | 10K. |
| Resistor **35** | 270K. |
| Resistor **47** | 1 meg. |
| Resistor **42***a* | 1K. |
| Resistor **48** | 2.2K. |
| Resistor **45** | 56K. |
| Resistor **51** | 33K. |
| Resistor **52** | 100K. |
| Input terminal **46** | 300 volts positive. |

While I have described the preferred form of my invention, it is understood that I do not limit myself to the details thereof since I am defining the scope of the invention in the appended claims.

I claim:

1. An apparatus for generating pulses synchronized by a variable frequency sine wave input signal, said apparatus comprising class C amplification means responsive to said input signal for amplifying corresponding positive portions thereof to produce a series of sine wave pulses; a rectifier, responsive to said sine wave pulses, coupled from the output of said class C amplification means to a point of substantially fixed potential, said rectifier being poled to conduct on the leading edge of said sine wave pulses whereby an output voltage is developed across said rectifier that commences to increase at the exact instant the instantaneous value of said sine wave pulses commences to decrease in magnitude and rises sharply thereafter at the trailing edges of said sine wave pulses; and means responsive to said output voltage for generating an output pulse at the instant said output voltage rises to a predetermined magnitude.

2. An apparatus for generating pulses in synchronism with a variable frequency input signal, said apparatus comprising amplification means responsive to said input signal for amplifying the more positive portions thereof to produce a series of amplified portions of said signal; a capacitor coupled to said amplification means and having an output terminal; a unidirectional conducting device connected between said output terminal of said capacitor and a point of substantially fixed potential, said device being poled to conduct during the leading edge the amplified portions of said signal whereby an output voltage is developed across said unidirectional conducting device that commences to increase at the exact instant the instantaneous value of said amplified portions of said signal commences to decrease in magnitude and rises sharply thereafter at the trailing edges of said amplified portions of said signal; and means responsive to said output voltage for generating an output pulse at the instant said output voltage rises to a predetermined magnitude.

3. An apparatus for generating periodic triggering signals in response to a variable frequency sine wave input signal, said apparatus comprising amplification means responsive to said input signal for amplifying the more positive portions thereof to produce a series of sine wave pulses; a capacitor coupled to said amplification means and having an output terminal; a unidirectional conducting device connected between said output terminal of said capacitor and a point of substantially fixed potential, said device being poled to conduct during the leading edge of said sine wave pulses whereby an output voltage is developed across said unidirectional conducting device that commences to increase exactly at the inversion point of said sine wave pulses and rises sharply during the trailing edges thereof; means for providing a direct-current reference potential of predetermined magnitude; and a coincidence circuit responsive to said output voltage and said direct current reference potential for producing a trigger signal at the instant said output voltage coincides with said direct-current reference potential.

4. A circuit for generating periodic pulses in response to a sine wave input signal, said circuit comprising amplification means responsive to said input signal for amplifying the more positive portions thereof to produce a series of sine wave pulses; a capacitor coupled to said amplification means and having an output terminal; a unidirectional conducting device connected between said output terminal of said capacitor and a point of substantial fixed potential, said device being poled to conduct during the leading edge of said sine wave pulses whereby an output voltage is developed across said unidirectional conducting device that commences to increase exactly at the inversion point of said sine wave pulses and rises sharply during the trailing edges thereof; means for providing a direct-current reference potential of predetermined magnitude; and coincidence circuit responsive to said output voltage and said direct-current reference potential for producing a trigger signal at the instant said output voltage coincides with said direct-current reference potential; and means responsive to said trigger signal for generating an output pulse.

5. The circuit for generating periodic pulses as defined in claim 4 wherein said means for generating an output pulse comprises a blocking oscillator.

6. A variable frequency pulse generator comprising in combination, an input for receiving a variable frequency timing wave; a capacitor, one side of which is connected to said input; a triode having a grid, an anode, and a cathode, said grid being connected to the other side of said capacitor; a resistor connected between said grid and ground, wherein the cathode of said triode is connected to ground and the time constant of the last-mentioned capacitor-resistor combination is substantially longer than the periodicity of said timing wave; means for providing a source of direct-current potential positive with respect to ground; a resistor connecting said anode to said source; a capacitor having one side connected to said anode; a resistor, one side of which is connected to the other side of the last-mentioned capacitor and the other side of which is grounded; a cathode follower stage including a triode having an anode connected to said source, a grid connected to the ungrounded end of the last-named resistor, and a cathode, said cathode follower stage having a resistor connecting the last-named cathode to ground; a capacitor, one side of which is connected to the last-named cathode; a rectifier having a cathode connected to the other side of the last-named capacitor and an anode connected to ground; a transformer having first, second and third windings; means connecting the cathode of said rectifier to one end of said first winding; a diode having an anode connected to the other side of the first winding, said diode having a cathode; a resistor connected at one end to the last-named cathode and having its other end grounded, said last-mentioned resistor having a tap thereon; a resistor connecting said tap to said source; a blocking oscillator including a triode having an anode connected to said source through said second winding, a grid capacitor for said blocking oscillator, said last-mentioned triode having a grid connected through said grid capacitor to the cathode of said diode; a resistor connecting the last-named grid to ground; the last-mentioned triode having a cathode, a resistor connecting the last-mentioned cathode to ground; and an output circuit connected to said third winding.

References Cited in the file of this patent

UNITED STATES PATENTS

| | | |
|---|---|---|
| 2,289,840 | Herz | July 14, 1942 |
| 2,572,016 | Elbourn | Oct. 23, 1951 |
| 2,600,270 | Saunders | June 10, 1952 |